Dec. 11, 1973 S. KARIUS 3,778,312
SOLAR CELL GENERATOR FOR FLIGHT MISSIONS IN
THE VICINITY OF THE SUN
Filed Jan. 22, 1969

Inventor:
Siegfried Karius
By: Spencer & Kaye
Attorneys

United States Patent Office 3,778,312
Patented Dec. 11, 1973

3,778,312

SOLAR CELL GENERATOR FOR FLIGHT MISSIONS IN THE VICINITY OF THE SUN

Siegfried Karius, Wedel, Holstein, Germany, assignor to Licentia Patent-Verwaltungs-G.m.b.H., Frankfurt am Main, Germany

Filed Jan. 22, 1969, Ser. No. 793,061
Claims priority, application Germany, Jan. 22, 1968, P 16 39 298.6
Int. Cl. H01l *15/02*
U.S. Cl. 136—89 6 Claims

ABSTRACT OF THE DISCLOSURE

A solar cell generator for use in spacecraft for missions in the vicinity of the sun. The generator includes a support carrying a field of solar cells which are bounded by a leading end region and a trailing end region. The support is movable relative to the spacecraft between a retracted position, in which the field of solar cells is out of the path of solar radiation, and an exposed position wherein the field of solar cells is exposed to the solar radiation. The support is capable of occupying intermediate positions, in each of which the leading end region of the field of solar cells and a portion of the field are exposed. The field of solar cells is covered by means for filtering the solar radiation. This filtering means has its minimum radiation permeability at the leading end region of the field and its maximum radiation permeability at the trailing end region, the radiation permeability thus increasing from the leading end to the trailing end region. The solar cell generator finally includes a device responsive to the amount of radiation striking the solar cells for moving the support between the retracted and the exposed positions to maintain a constant output from the field of solar cells.

BACKGROUND OF THE INVENTION

The present invention relates to a solar cell arrangement suitable for use with a spacecraft designed for missions in the vicinity of the sun.

It is known that the power of a solar cell increases with increasing intensity of the impinging radiation as long as the temperature remains constant, but decreases again with increasing temperature. With spacecraft designed for missions in the vicinity of the sun which derive their power from solar cells, the problem now exists to produce maximum power at a rate as uniform as possible during the entire mission from the vicinity of the earth to the vicinity of the sun. In the absence of corrective measures, the power of a field of solar cells will first increase upon approach to the sun due to the higher intensity of the light, but then decrease again with even higher radiation due to the increase in temperature. This decrease is so significant that with intensities of, for example, 10 solar constants, practically no power will be produced. The high temperature in the vicinity of the sun also exerts an adverse influence on the dependability of the solar cells. Not only are the solar cells connected together with soft solder, but also high temperatures can damage the adhesive which attaches the cover glasses to the solar cells as a protection against particle radiation.

It is now known to place the surfaces which support the solar cells at an angle with the incoming radiation as the ambient light intensity increases. This technique reduces the irradiation of the solar cells by a cosine-dependent factor and avoids overheating. The drawback here, however, is that when the irradiation from the sun becomes very intense, the angle between the surface normal and the direction of propagation of the incident light very closely approaches 90° (where the cosine=0).

Accurate control is difficult in this region because only slight deviations in the angle already result in great changes in the amount of impinging light.

It is further known to cover solar cells which are disposed either on extended surfaces or directly on the spacecraft with narrow-band reflection filters or partially permeable mirrors in order to reduce the amount of incident light and to reduce the temperature. However, the possibility is in this case lacking of adapting the system to the available sun radiation and thus realizing an optimum utilization of the solar cells for a wide range of light intensities. Finally, various developments have been made with solar cells arranged on a supporting device which may be telescoped or folded out from a receptacle disposed on or in the spacecraft.

SUMMARY OF THE INVENTION

An object of the present invention, therefore, is to provide a solar cell generator which permits the optimum utilization of the solar cells while the unfavorable thermal influences are reduced to a minimum.

This object, as well as other objects which will become apparent in the discussion that follows, is achieved, according to the present invention, by combining the extendable solar cell arrangement described above with a partially reflecting optical system in the following manner.

A support is provided to carry a field of solar cells which are bounded by a leading end region and a trailing end region. The support is made movable relative to the spacecraft between a retracted position in which the field of solar cells is out of the path of solar radiation impinging on the spacecraft and an exposed position wherein said field of solar cells is exposed to the solar radiation. The support is made capable of occupying intermediate positions wherein the leading end region of the field or solar cells and a portion of the field are exposed.

The solar cells are covered with means for filtering the incident radiation. These means, which, for example, can comprise narrow-bandwidth filters or partially reflective mirrors, are constructed with a minimum permeability to solar radiation at the leading end region of the field of solar cells and a maximum permeability to solar radiation at the trailing end region. The radiation permeability is made to increase from the leading end region to the trailing end region.

Finally, a control or regulating device is provided to move the support between the various positions thereof in dependence upon the amount of radiation striking the solar generator. This device can thus control the amount of solar cell area exposed to radiation to maintain a constant voltage, current or power output from the generator.

The bandwidths of the filters or permeability values of the mirrors, together with the extended distance of the solar cell generator, can be so dimensioned, or regulated, respectively, that optimum utilization of the solar cells is assured and, at the same time, the retracted or unexposed portion of the arrangement is protected against overheating. On a mission in the vicinity of the sun only a slight portion of the entire area of the solar cell generator is extended; i.e., according to the present invention only that portion whose filter or mirror exhibits the highest reflection and thus the lowest temperature. In positions further away from the sun where the light intensity is much less, a larger portion of the solar cell generator may be extended to expose the areas with lesser degrees of reflection. The size of the exposed solar cell area is here controlled by a setting or regulating device which is controlled, for example, by temperature sensors, or by the power output of the generator itself.

DESCRIPTION OF THE PREFERRED EMBODIMENTS

Figure 1:
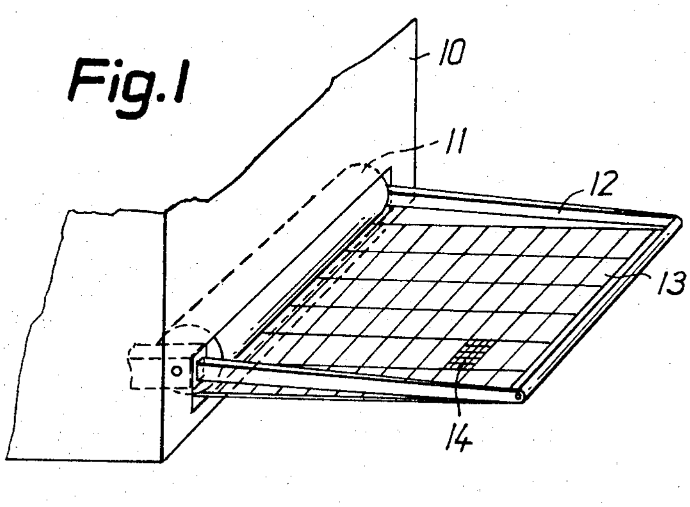
FIG. 1 is a partly representational, perspective view of a preferred embodiment of the solar cell generator according to the present invention.

Referring now to the drawing which illustrates a preferred embodiment of the generator according to the present invention, there is shown in FIG. 1, a spacecraft 10 provided with a receptacle in the form of a cylindrical roller 11. The solar cell surface, which is flexible, is wound on this roller when in the retracted position. The solar cell surface is held outward when in the extended position by support arms 12. The surface itself is formed by a thin, flexible carrier foil 13 which supports the solar cells 14.

Figure 2:
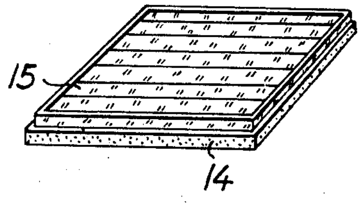
FIG. 2 is an enlarged cutaway view of a portion of the generator of FIG. 1.

The solar cell surface is shown in detail in FIG. 2. The solar cells 14 are covered by quartz layers 15 which contain the necessary partially permeable filter or mirror layers.

Figure 3:
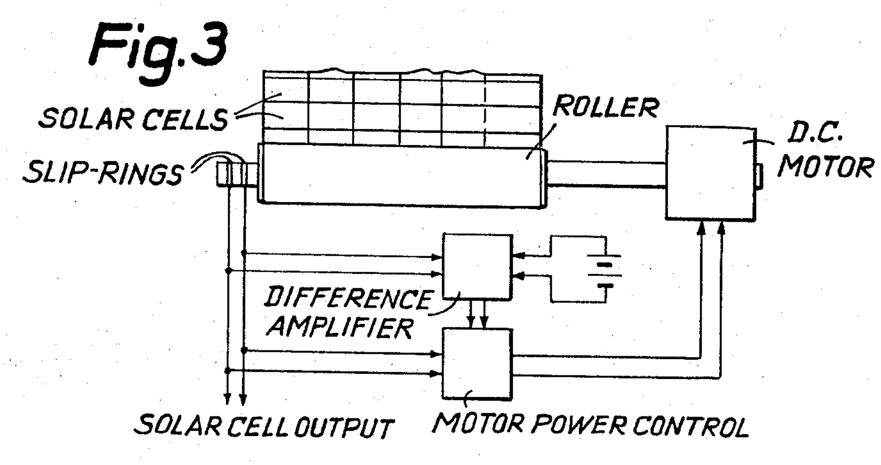
FIG. 3 is a schematic diagram of the arrangement for controlling the position of the solar cell surface in the generator of FIG. 1.

The apparatus for controlling the exposed solar cell area is shown in FIG. 3. The roller 11 is driven with the aid of a D.C. electric motor to vary the extended length of the solar cell surface. As the motor unwinds the roller, the arms 12, which are spring biased toward the extended position, carry the solar cell surface outward. The motor is sufficiently powerful to overcome the bias force applied to the arms, so that it can retract the solar cell surface by winding the roller.

The motor is controlled to vary the exposed area of the solar cell surface in dependence on the available sunlight radiation so that the most favorable utilization of the solar cells will be assured at all times. The D.C. motor may be controlled in a variety of ways: it may, for example, be controlled by one or more temperature sensors, or it may be controlled directly by the output voltage of the solar cell generator, as shown.

In the embodiment illustrated the output of the solar cell generator is applied to a difference amplifier which compares the actual voltage produced with a desired voltage, produced, for example, by a battery. The deviations from the desired voltage are then employed to control the power applied to the electric motor in such a way that the deviations will be eliminated; that is, a positive output from the difference amplifier causes power of the appropriate sign to be applied to the motor such that the motor will retract the solar cell surface, and vice versa.

The solar cell engerator according to the present invention is therefore effective to produce a constant power (or voltage) output without exposing the solar cells to high temperatures.

It will be understood that the above description of the present invention is susceptible to various modifications, changes and adaptations.

I claim:

1. For use in a spacecraft, a solar cell arrangement comprising, in combination:

(a) a carrier forming a solar cell surface and supporting a field of solar cells bounded by a leading end region and a trailing end region, said carrier being movable relative to the spacecraft between a retracted position in which the field of solar cells is out of the path of solar radiation impinging on the spacecraft and an exposed position wherein said field of solar cells is exposed to the solar radiation, said carrier being capable of occupying intermediate positions in each of which said leading end region of said field of solar cells and a portion of said field are exposed;

(b) radiation filtering means overlying said solar cells and having its minimum radiation permeability at said leading end region of said field and its maximum radiation permeability at said trailing end region of said field, the radiation permeability of said filtering means increasing from said leading end region to said trailing end region; and (c) means responsive to the amount of radiation striking said solar cells for moving said carrier between said positions thereof thereby to maintain a desired quantity of output from said field of solar cells.

2. The solar cell arrangement defined in claim 1 wherein said radiation filtering means in a narrow-bandwidth filter.

3. The solar cell arrangement defined in claim 1 wherein said radiation filtering means is a partially reflective mirror.

4. The solar cell arrangement defined in claim 1 wherein said carrier is flexible and wherein said means for moving said carrier includes means for rolling the retracted portion of said carrier.

5. The solar cell arrangement defined in claim 1 wherein said means for moving said carrier includes means for extending said carrier outward from the spacecraft, said leading end region of said field of solar cells thereby being movable between a point at least adjacent to the spacecraft and a point spaced apart from the spacecraft.

6. The solar cell arrangement defined in claim 5 wherein said carrier is arranged inside of said spacecraft when in the retracted position.

References Cited

UNITED STATES PATENTS

| | | | |
|---|---|---|---|
| 3,346,419 | 10/1967 | Webb | 136—89 |
| 3,459,391 | 8/1969 | Haynos | 136—89 X |

OTHER REFERENCES

F. J. CAMPBELL: "Effects of Radiation of Transmittance of Glass & Adhesives," in Proc. 17th Ann Power Sources Conf., October 1963, pp. 19–22.

Mann: "Photovoltaic Conversion," in 14th Ann Power Sources Conf., May 1960, pp. 28–32.

Ralph: "Effects of Anti-Reflection Coatings & Coverglass on Silicon Solar Cell Performance," in I.E.E.F. Transaction on Electron Devices, September 1965, vol. Ed. 12, No. 9, pp. 493–496, October 10, 1965.

ALLEN B. CURTIS, Primary Examiner

U.S. Cl. X.R.

244—155